US009372776B2

(12) United States Patent
Diment et al.

(10) Patent No.: US 9,372,776 B2
(45) Date of Patent: Jun. 21, 2016

(54) MONITORING USER ACTIVITY AND PERFORMANCE OF COMPUTERIZED DEVICES

(71) Applicant: ATERNITY INFORMATION SYSTEMS LTD., Hod Hasharon (IL)

(72) Inventors: Andrey Diment, Jerusalem (IL); Amir Leshman, Savyon (IL); Konstantin Ivanov, Hod Hasharon (IL); Yigal Karmazin, Petah Tikva (IL)

(73) Assignee: ATERNITY INFORMATION SYSTEMS LTD., Hod Hasharon (IL)

( * ) Notice: Subject to any disclaimer, the term of this patent is extended or adjusted under 35 U.S.C. 154(b) by 271 days.

(21) Appl. No.: 14/170,827

(22) Filed: Feb. 3, 2014

(65) Prior Publication Data

US 2015/0220417 A1    Aug. 6, 2015

(51) Int. Cl.
*G06F 15/173* (2006.01)
*G06F 11/30* (2006.01)
*G06F 11/34* (2006.01)
*H04L 29/08* (2006.01)

(52) U.S. Cl.
CPC ........ *G06F 11/3438* (2013.01); *G06F 11/3409* (2013.01); *H04L 67/22* (2013.01)

(58) Field of Classification Search
CPC ... G06F 1/3203; G06F 1/3209; G06F 1/3215; G06F 21/552; G06F 21/577; G06F 21/554; H04L 63/20; H04L 41/06
See application file for complete search history.

(56) References Cited

U.S. PATENT DOCUMENTS

| 6,934,750 B2* | 8/2005 | Hijikata | G06F 17/30905 707/E17.121 |
| 2003/0177394 A1* | 9/2003 | Dozortsev | G06F 21/52 713/187 |
| 2007/0168696 A1 | 7/2007 | Ridel et al. | |
| 2009/0109228 A1* | 4/2009 | Shuster | A63F 13/12 345/474 |
| 2009/0144568 A1* | 6/2009 | Fung | G06F 1/3203 713/300 |
| 2013/0097662 A1* | 4/2013 | Pearcy | G06F 21/577 726/1 |

* cited by examiner

*Primary Examiner* — Peling Shaw
(74) *Attorney, Agent, or Firm* — Browdy and Neimark, PLLC

(57) ABSTRACT

The presently disclosed subject matter includes a device, system and method for monitoring activity at a computerized device, the device running one or more processes, at least one of the processes executing one or more system events being part of an activity. An activity of interest can be identified if system events related to the activity of interest are identified. An activity is monitored at the device using API queries to obtain descriptive information of the at least one respective system event executed as part of the activity. Using non-intrusive monitoring methods which are based on API queries enables to reduce the potential of interference of the monitoring with applications running on the monitored device.

26 Claims, 6 Drawing Sheets

US 9,372,776 B2

MONITORING USER ACTIVITY AND PERFORMANCE OF COMPUTERIZED DEVICES

FIELD OF THE PRESENTLY DISCLOSED SUBJECT MATTER

The presently disclosed subject matter relates to the field of computer systems monitoring.

BACKGROUND

Today computer systems of various sizes exist which include various types of computerized devices connected to one or more networks. Computerized devices can include for example, different types of servers, databases and/or message queues as well as computer terminals (or end points). Each of the computerized devices may be running a plurality of applications.

It is often desirable to monitor the performance of computerized devices as well as the applications running on computerized devices within a network. Data which is collected while monitoring, can be used for analyzing the performance of individual computerized devices and applications running on such computerized devices as well as the overall network performance. Computerized devices' performance analysis enables to detect various operational problems and performance degradation, and to provide support services for rectifying the detected problems and/or performance degradation.

Monitoring the performance of computerized devices is often accomplished by deploying agents to the computerized devices. The agents are capable of collecting information characterizing the operation of computerized devices and applications running thereon. The collected information can be used for determining whether the computerized devices or applications are functioning properly.

Published documents considered to be relevant as background to the presently disclosed subject matter are listed below. Acknowledgement of the documents herein is not to be inferred as meaning that these are in any way relevant to the patentability of the presently disclosed subject matter.

US Patent Application, Publication No. 2007/0168696 discloses that a system is monitored by detecting activity signatures of network components. Some of the activity signatures are generated by sensing patterns of operations in data streams. Some of the activity signatures are precompiled in the system, or are standard in computer systems. The activity signatures are stored in a database. Select information about select baselined attributes generates monitoring profiles (MPs) for the baselined attributes. The MPs are defined so abnormal behavior of end points and/or system components can be detected. The system compiles baseline values for baselined attributes of MPs. By properly analyzing deviating end points or components one can determine what is causing a problem or who is affected by a problem based on which identifying attributes are common to the deviating end points or components.

GENERAL DESCRIPTION

According to one aspect of the presently disclosed subject matter there is provided a computerized method of monitoring activity at a monitored computerized device, the monitored device running one or more processes, at least one of the processes executing one or more system events being part of an activity, the method comprising, using a computer processor for:

obtaining an execution plan, the execution plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;

the execution plan comprising, for at least one respective system event of interest one or more API queries; each query is generated based on a condition of a respective opcode and enables to obtain descriptive information of the at least one respective system event of interest;

responsive to detection of a given system event, using the execution plan for calling the one or more API queries of the given system event and obtaining descriptive information of the given system event;

determining that the given system event is a system event of interest, if the descriptive information of the given system event meets the respective conditions of the respective opcode; and determining that a given activity of interest has been executed if system events of interest represented by a group of respective opcodes in a signature representing the activity of interest are identified.

In addition to the above features, the system according to this aspect of the presently disclosed subject matter can optionally comprise one or more of features (i) to (xii) listed below, in any desired combination or permutation:

i). Wherein the API queries are assistive technology API queries.

ii). Wherein the method further comprises: obtaining the agent configuration data and generating the execution plan based on the obtained agent configuration data.

iii). Wherein the agent configuration data further comprises query logic comprising rules for guiding the generation of the execution plan and wherein the rules are configured to reduce interference with processes running on the monitored computerized device.

iv). Wherein the execution plan is generated as a hierarchical data structure; wherein the one or more assistive technology API queries are ordered in the hierarchical data structure based on their respective priority.

v). Wherein the method further comprises: registering one or more listeners configured to listen to system events generated by one or more processes of interest capturing occurrence of system events.

vi). Wherein the method further comprises: if it is determined that the given system event is a raw HID (human interaction device) system event, linking the given system event with at least one related assistive technology object; using the execution plan and invoking the one or more assistive technology API queries with respect to the at least one related assistive technology object.

vii). Wherein associating the given system event comprises: responsive to detection of a mouse click event, obtaining screen coordinates indicative of the mouse click location on the screen; and using assistive technology API queries to identify at least one related assistive technology object occupying the respective coordinates at the time of the mouse click event.

viii). Wherein the method further comprises: maintaining a record of the last keyboard focus; responsive to detection of a keyboard stroke event, using assistive technology API queries to identify at least one related assistive technology object on which the last keyboard focus was located.

ix). Wherein the determining that a given activity of interest has been executed further comprises: determining that system events of interest represented by the group of respective opcodes in the signature comply with respective signature conditions defining the interrelations between the system events.

x). Wherein the method further comprises: collecting performance data of the activity of interest, the collected performance data enabling to determine respective performance metrics.

xi). Wherein the method further comprises: generating the at least one activity signature, comprising: obtaining data indicative of at least one process of interest; registering listeners for detecting occurrence of system events of executed by the at least one process of interest; responsive to detection of a system event, using assistive technology API queries for enriching event descriptive data; selecting a group of one or more system events and generating respective opcodes for each system event in the group; generating a respective activity signature comprising the group of one or more opcodes of interest, the activity signature uniquely identifying a given activity;

xii). Wherein the method further comprises: generating activity signatures based on rules directed to reducing interference with other processes running on the monitored computerized device.

According to another aspect of the presently disclosed subject matter there is provided a monitored computerized device, the computerized device comprising at least one computer processor operatively connected to computer memory configured for running one or more processes, at least one of the processes executing one or more system events being part of an activity; the at least one computer processor is configured to:

obtain an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;

the execution plan comprising, for at least one respective system event of interest one or more API queries; each query is generated based on a condition of a respective opcode and enables to obtain descriptive information of the at least one respective system event of interest;

responsive to detection of a given system event, utilize the execution plan for calling the one or more API queries of the given system event and obtain descriptive information of the given system event;

determine that the given system event is a system event of interest, if the descriptive information of the given system event meets the respective conditions of the respective opcode; and determine that a given activity of interest has been executed if system events of interest represented by a group of respective opcodes in a signature representing the activity of interest are identified.

According to another aspect of the presently disclosed subject matter there is provided a system for monitoring performance of one or more monitored computerized devices connected to the system over a communication network; the system comprises at least one processing unit comprising computer memory operatively connected to at least one processing unit; the at least one processing unit is configured to:

deploy an agent to each one of the one or more monitored computerized devices; the agent comprising instructions for monitoring activities on the computerized devices to:

obtain an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;

the execution plan comprising, for at least one respective system event of interest, one or more API queries; each query is generated based on a condition of a respective opcode and enables to obtain descriptive information of the at least one respective system event of interest;

responsive to detection of a given system event, utilize the execution plan for calling the one or more API queries of the given system event and obtain descriptive information of the given system event;

determine that the given system event is a system event of interest, if the descriptive information of the given system event meets the respective conditions of the respective opcode; and determine that a given activity of interest has been executed if system events of interest represented by a group of respective opcodes in a signature representing the activity of interest are identified;

the processing unit is further configured to receive from the one or more monitored computerized devices performance data of the activity of interest and utilize the collected performance data for determining respective performance metrics.

According to another aspect of the presently disclosed subject matter there is provided a program storage device readable by a machine, tangibly embodying a program of instructions executable by the machine to perform method steps of monitoring activity at a monitored computerized device, the monitored device running one or more processes, at least one of the processes executing one or more system events being part of an activity, the method comprising:

obtaining an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;

the execution plan comprising, for at least one respective system event of interest one or more API queries; each query is generated based on a condition of a respective opcode and enables to obtain descriptive information of the at least one respective system event of interest;

responsive to detection of a given system event, using the execution plan for calling the one or more API queries of the given system event and obtaining descriptive information of the given system event;

determining that the given system event is a system event of interest, if the descriptive information of the given system event meets the respective conditions of the respective opcode; and determining that a given activity of interest has been executed if system events of interest represented by a group of respective opcodes in a signature representing the activity of interest, are identified.

According to another aspect of the presently disclosed subject matter there is provided a computer program product comprising a computer useable medium having computer readable program code embodied therein of monitoring activity at a monitored computerized device, the monitored device running one or more processes, at least one of the processes executing one or more system events being part of an activity, the computer program product comprising:

computer readable program code for causing the computer to obtain an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;

the execution plan comprising, for at least one respective system event of interest, one or more API queries; each query is generated based on a condition of a respective opcode and enables to obtain descriptive information of the at least one respective system event of interest;

computer readable program code for causing the computer to detect a given system event and use the execution plan for calling the one or more API queries of the given system event and obtain descriptive information of the given system event;

computer readable program code for causing the computer to determine that the given system event is a system event of interest, if the descriptive information of the given system event meets the respective conditions of the respective opcode; and computer readable program code for causing the computer to determine that a given activity of interest has been executed if system events of interest represented by a group of respective opcodes in a signature representing the activity of interest are identified.

The computerized monitored device, the system and the program storage device and the computer program product disclosed in accordance with the presently disclosed subject matter can optionally comprise one or more of features (i) to (xii) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

Figure 1:
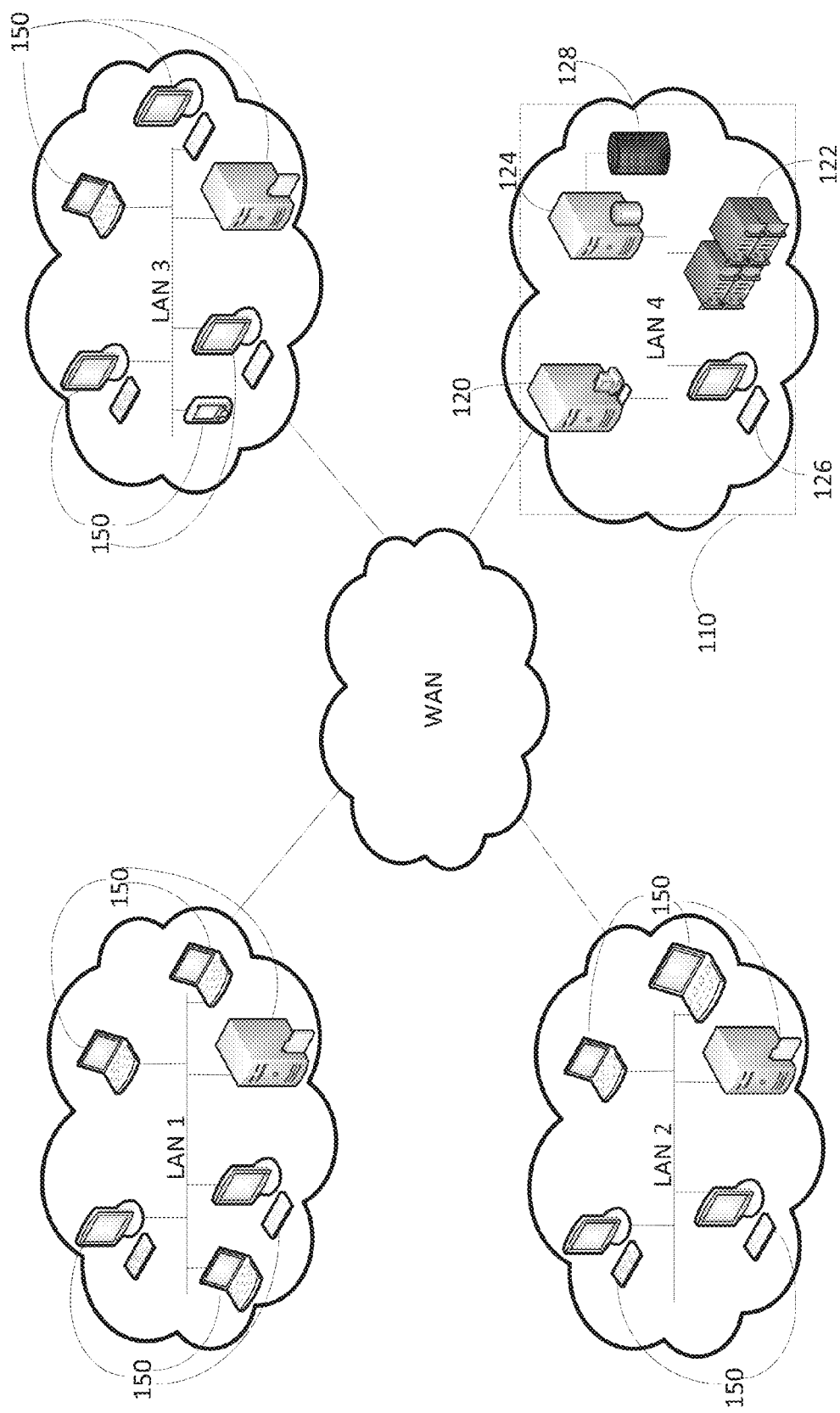
FIG. 1 is a functional block diagram schematically illustrating a computer network, in accordance with the presently disclosed subject matter.

It is noted that elements in the drawings are not necessarily drawn to scale.

DETAILED DESCRIPTION

Unless specifically stated otherwise, as apparent from the following discussions, it is appreciated that throughout the specification discussions utilizing terms such as "obtaining", "generating", "using", "calling", "determining", "registering" or the like, include action and/or processes of a computer that manipulate and/or transform data into other data, said data represented as physical quantities, e.g. such as electronic quantities, and/or said data representing the physical objects.

The terms "computer", "computerized device", "processing unit", "machine" or variation thereof should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
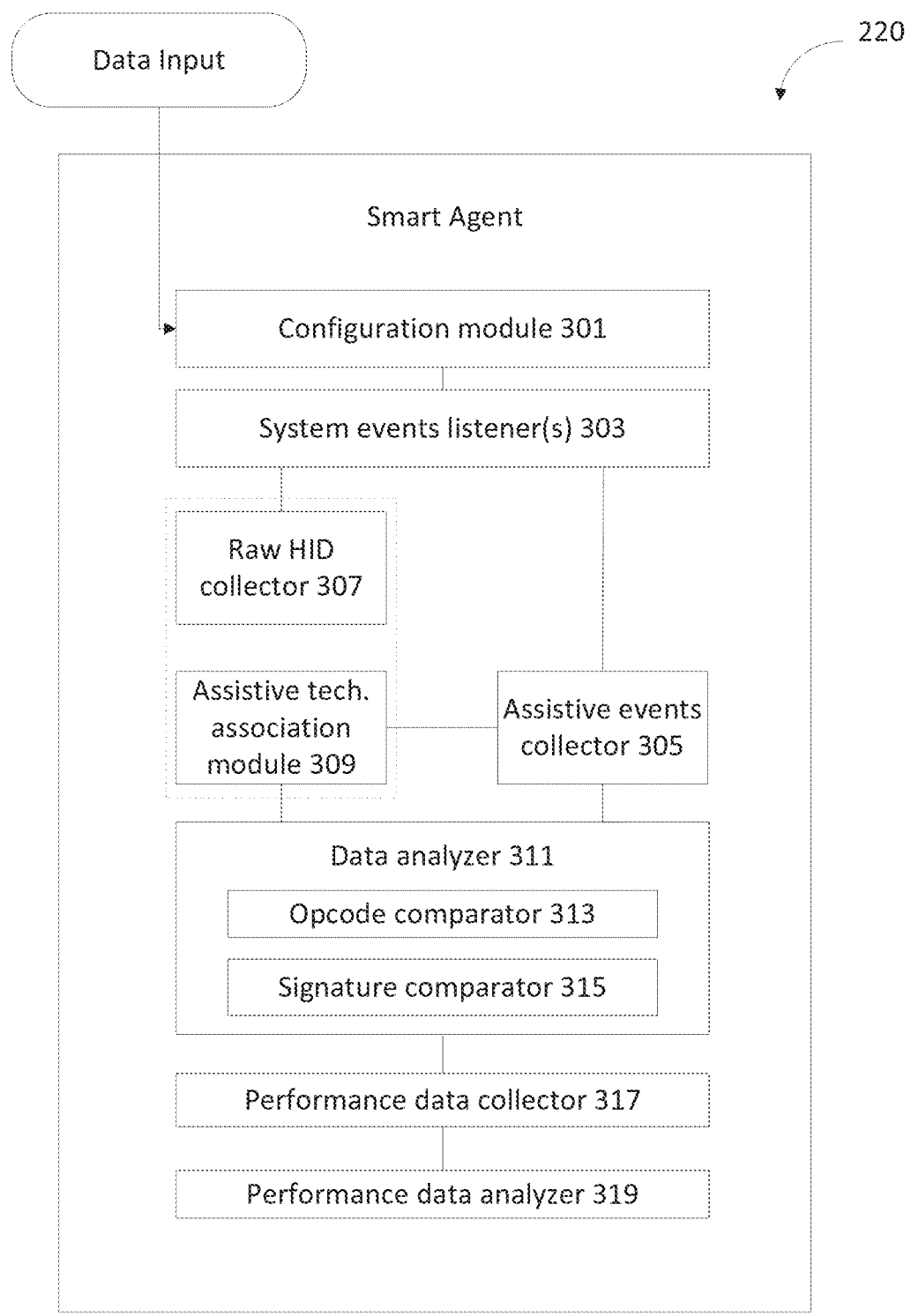
FIG. 3 is a functional block diagram of an example of an agent, in accordance with the presently disclosed subject matter.
Figure 4:
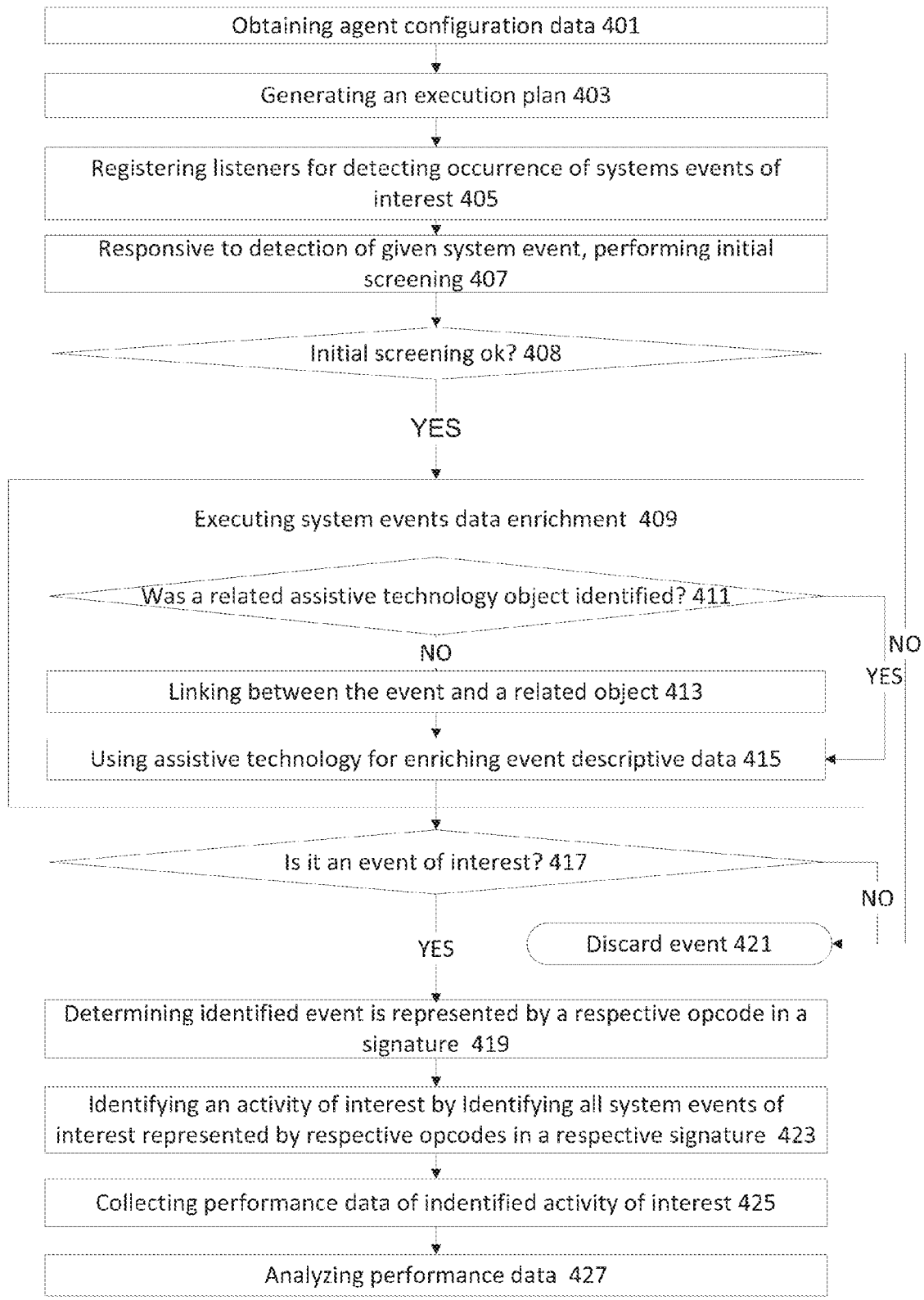
FIG. 4 is a flowchart showing an example of a sequence of operations performed by an agent, in accordance with the presently disclosed subject matter.
Figure 5:
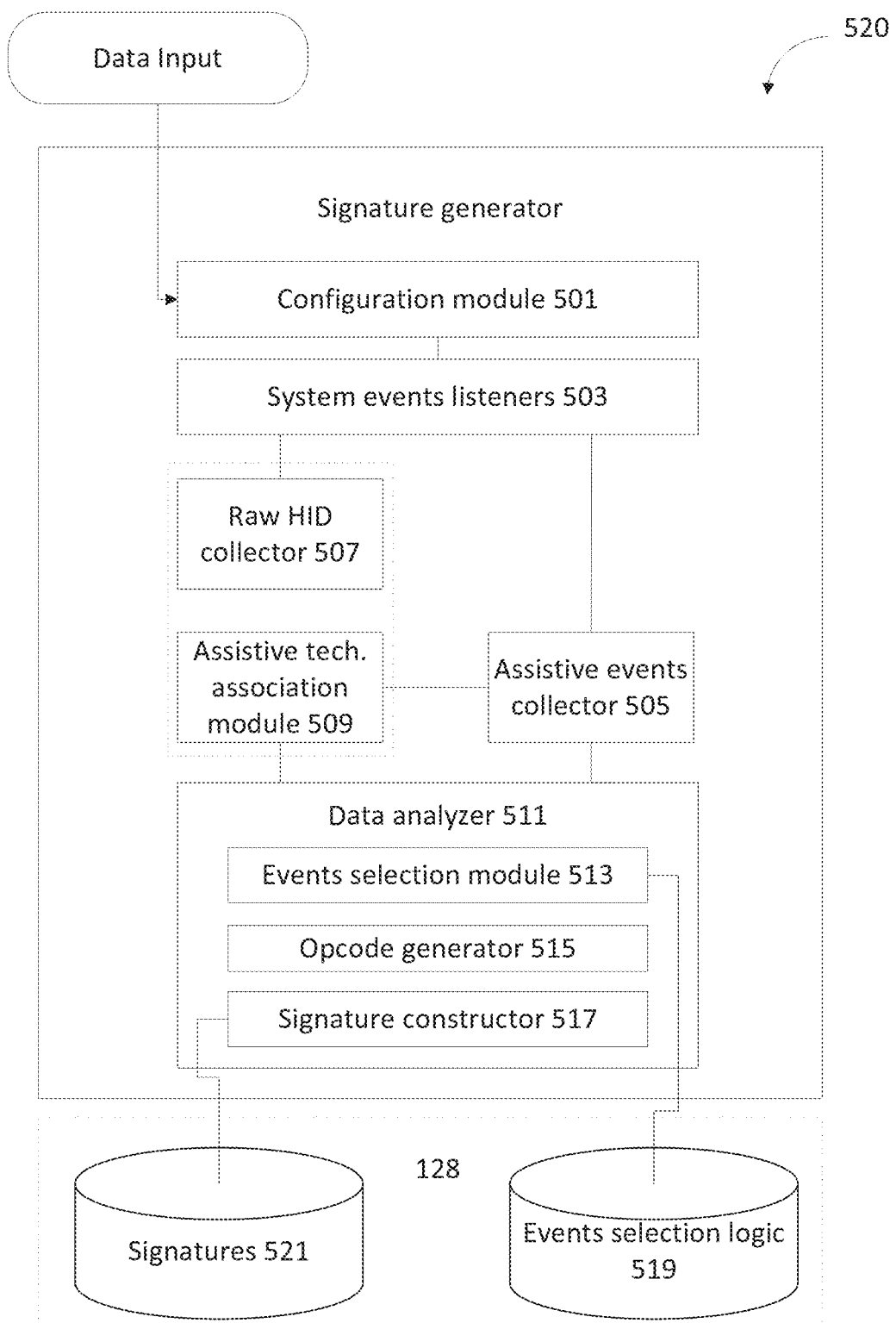
FIG. 5 is a functional block diagram of an example of a signature generator, in accordance with the presently disclosed subject matter.
Figure 6:
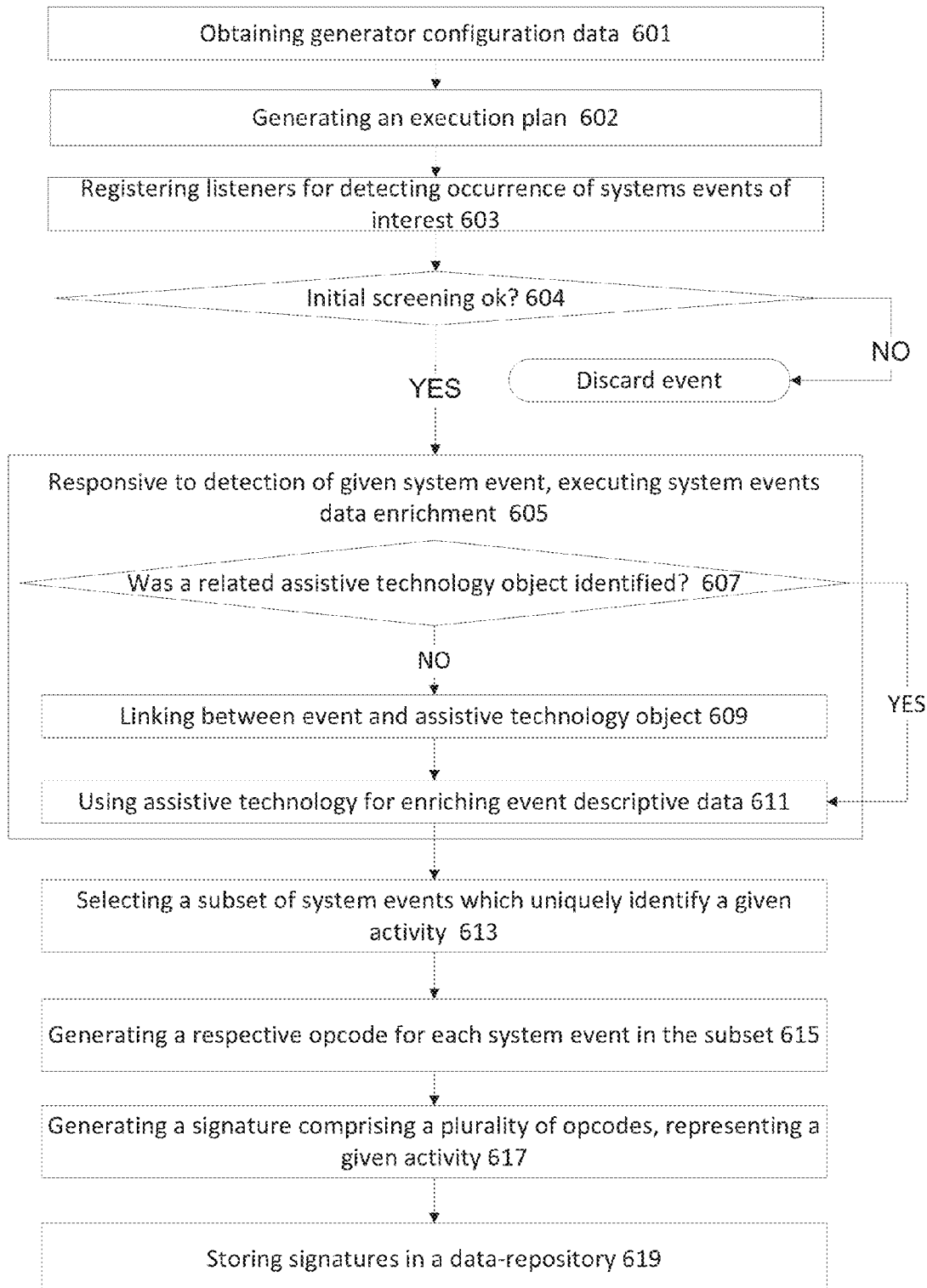
FIG. 6 is a flowchart showing an example of a sequence of operations performed during signature generation, in accordance with the presently disclosed subject matter.

In embodiments of the presently disclosed subject matter, fewer, more and/or different stages than those shown in FIGS. 4 and 6 may be executed. In embodiments of the presently disclosed subject matter one or more stages illustrated in FIGS. 4 and 6 may be executed in a different order and/or one or more groups of stages may be executed simultaneously. Functional elements in FIGS. 1, 2, 3 and 5 can be made up of a combination of software and hardware and/or firmware that performs the functions as defined and explained herein. The functional elements in FIGS. 1, 2, 3 and 5 can comprise at least one respective computer processor and/or computer memory or can be a part of a computer processor or of a computer memory, the computer processor and the memory being configured for executing instructions for performing the respective functions. The network shown in FIG. 1 or various components thereof depicted in FIGS. 2, 3 and 5 may comprise fewer, more, and/or different modules than those shown in the figures.

Bearing the above in mind, attention is now drawn to FIG. 1 showing a functional block diagram schematically illustrating a computer network, in accordance with the presently disclosed subject matter. The network architecture in FIG. 1 is an example which demonstrates some general principles of the subject matter disclosed herein and should not be construed as limiting in any way.

Network 100 may be based on any type of communication network or any combination of different types of networks. For example, network 100 can be realized by way of example over any one of the following networks: the Internet, a local area network (LAN), wide area network (WAN), metropolitan area network (MAN), any type of telephone network (including for example PSTN with DSL technology) or mobile network (Including for example GSM, GPRS, CDMA etc.) or any combination thereof. Communication in the network can be realized through any suitable connection (including wired or wireless) and communication technology or standard (WiFi, 3G, LTE, etc).

Specifically, FIG. 1 illustrates, by way of example, four local area networks (LAN 1, LAN2, LAN3 and LAN 4) all connected to single wide area network (e.g. the Internet). For the purpose of the following discussion it can be assumed that each one of LAN 1, LAN 2 and LAN 3 belongs to a different organization (e.g. business organizations or otherwise), each being monitored individually according to the specific needs of the organization. As demonstrated in FIG. 1, multiple computerized devices are connected to each LAN. Each computerized device is running various applications.

LAN 4 comprises shared data center 110 configured for managing the monitoring operations in network 100. Although shared data center 110 is illustrated as a separate LAN it is not necessarily configured as such. For example, shared data center 110 can be implemented as one or more devices directly connected to WAN or as part of one of the monitored LANs connected to network 100 or it can be distributed over different LANs.

Shared data center 110 can comprise for example, monitoring processing unit 120, data analytics processing unit 122 and data-repository processing unit 124. Any one of these units can be configured as an individual computerized device in network 100 (e.g. monitoring server computer, analytics server computer and CMDB server, respectively). Alternatively, more than one processing unit can be consolidated in a signal computerized device (e.g. in a single computer server device).

Monitoring processing unit 120 can be configured to deploy monitoring agents to selected monitored devices 150 in network 100 and receive from the deployed agents collected operational data as described in detail below. Analytics unit 122 can be configured to analyze the collected operational data and determine various performance data (including performance metrics) with respect to monitored devices and applications running on the monitored devices.

Data-repository processing unit 124 (e.g. configuration management database) is operatively connected to data-repository 128 and configured for managing information stored in the data-repository. Shared data center 110 can further comprise one or more user interfaces 126 (e.g. computer terminal comprising display, keyboard and mouse) for providing access to the various components of data center 110.

Monitored devices 150 can include in general any type of computerized device with data processing capabilities including for example, computer server devices as well as various end devices such as personal computer devices, laptop computer devices, smartphone devices, notepad devices, tablet devices, notebooks, cameras, scanners, watches, cars etc. Monitored devices 150 can further include virtual devices running for example a virtual desktop or XEN App Sessions, where the actual applications are running on a remote computer device (e.g. in the Cloud).

As mentioned above, operational data collection can be accomplished by deployment of agents to monitored devices 150. The term "operational data" as used herein includes information indicative of processes running on a monitored end device as well as activities and system events being executed by the identified processes.

The agents are configured to monitor selected processes of interest being executed on the monitored devices 150 and obtain respective operational data. By providing monitored devices 150 with monitoring capabilities, monitored devices of various types can be transformed into self-monitoring platforms. Furthermore, according to the presently disclosed subject matter, the monitoring capabilities disclosed herein are configured to identify and analyze specific user interactions with the monitored device and the applications running thereon, thus turning the monitored devices into user experience aware devices.

Previously known monitoring agents which are commonly used for the purpose of monitoring computerized devices (which are based for example on hooking and code injection and often change the operation of the monitored application) involve the risk that their own operations would interfere with the operations of other applications running on the monitored device. Such interference can result for example, in potential conflicts with the monitored applications and/or third party software. Thus, deployment of agents, while initially intended to improve the performance of monitored devices 150 and running applications, may cause performance degradation of the monitored device or of the applications running thereon.

Accordingly, the presently disclosed subject matter includes a method and system for non-intrusive operational data collection. The agents disclosed herein (referred to herein as "smart agents") are configured to implement non-intrusive methods for collecting operational data and thereby reduce the potential of collision with other applications running on the same monitored devices 150 and the resulting performance degradation. Different to previously known methods, smart agents are neither injected nor incorporated into the code of the monitored applications. Rather, smart agents are configured to employ listeners for capturing system events as they occur. Based on the system events, smart agents are configured to identify that a certain activity has been executed. Performance data with respect to the identified activity can then be collected and used for analyzing the performance of the monitored applications.

Furthermore, as explained in more detail below, the disclosed monitoring technique harnesses assistive technology API, which was originally designed for aiding disabled users, for the purpose of operational data enrichment. The use of assistive technology API helps to reduce potential conflicts with other applications running on the monitored device.

Figure 2:
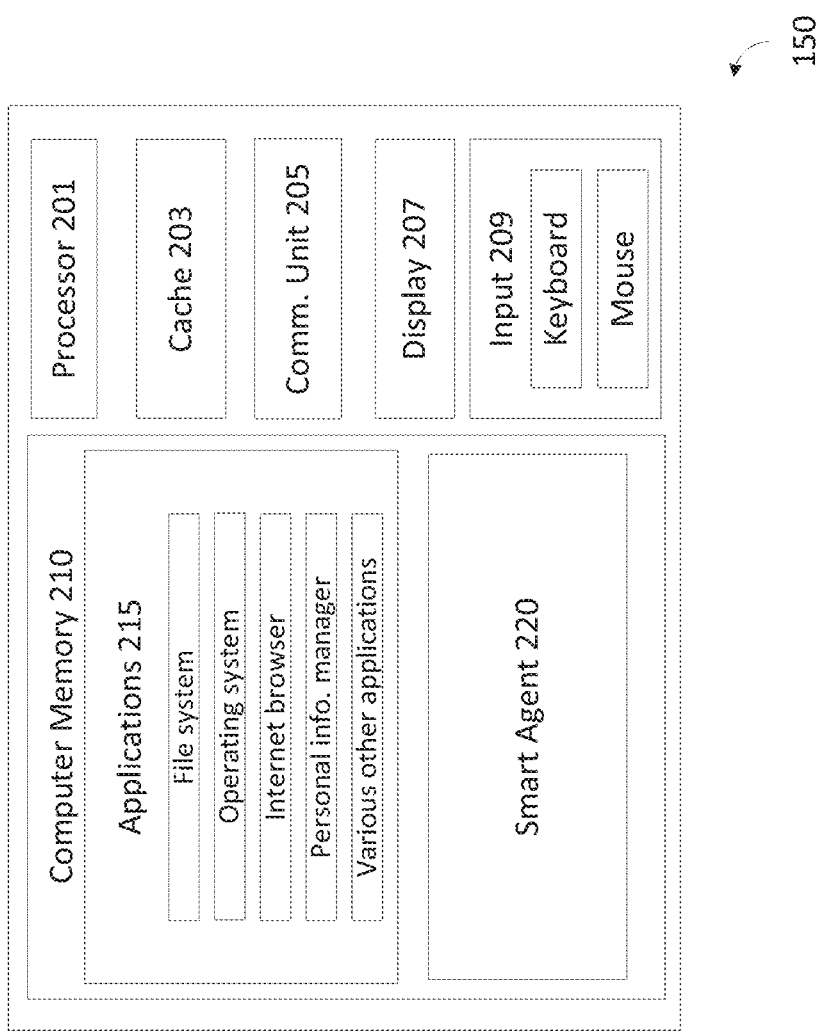
FIG. 2 is a functional block diagram of an example of a monitored device, in accordance with the presently disclosed subject matter.

FIG. 2 is a functional block diagram of an example of a monitored device, in accordance with the presently disclosed subject matter. Monitored device 150 comprises: one or more computer processors 201 operatively connected to computer memory (e.g. 210 and 203); communication unit 205 for enabling communication over computer networks; and user interface devices including display 207 and input devices 209 such as keyboard and mouse. Monitored device 150 can be for example an end device serving as a user terminal.

Monitored device 150 can further comprise computer memory 210 configured for storing various programs, including by way of non-limiting example: one or more operating systems (e.g. Microsoft Windows, Linux, Unix, Mac OS); one or more file systems; one or more Internet browsers (e.g. Internet Explorer, Mozzila Firefox, Google Chrome, etc.); one or more personal information managers applications (e.g. Microsoft Outlook, Google Calendar, etc.); one or word processing applications (e.g. Microsoft Word Processor, OpenOffice, etc.); one or more media players; and various other programs.

Computer memory 210 can be operatively connected to one or more processors (functionally represented as processor 201) configured in turn to execute the various programs and perform various operations responsive to received instructions.

According to the presently disclosed subject matter, monitored device 150 further comprises smart agent 220 (e.g. in computer memory 210) configured in general to monitor the operation of one or more selected applications running on device 150 and to collect operational data with respect to processors and activities which are being executed at the device.

FIG. 3 is a functional block diagram showing an example of a smart agent, in accordance with the presently disclosed subject matter. According to one example, as illustrated in FIG. 2, smart agent 220 can be configured as part of a computer memory, the memory being operatively coupled to a computer processor and comprising instructions for the computer processor to perform respective functions. In another example, smart agent 220 can be configured as part of a computer processor.

FIG. 4 is a flowchart showing an example of a sequence of operations which are performed by smart agent 220, in accordance with the presently disclosed subject matter. For clarity purposes the description of the operations in FIG. 4 is provided with reference to respective elements illustrated in FIG. 3. However, this is done by way of example only, and the operations in FIG. 4 should not be construed to be limited by the specific configuration which is exemplified in FIG. 3.

As mentioned above a smart agent is installed in a computerized device which is desired to be monitored (i.e. a monitored device). Before initiating actual monitoring a configuration stage is executed. Smart agent 220 can undergo configuration before or after it is installed in a monitored device.

Configuration of smart agent 220 can be accomplished with the help of "agent configuration data". At block 401 agent configuration data is obtained by smart agent 220. Agent configuration data can be received for example from shared data center 110. Agent configuration data comprises information indicative of at least one selected activity of interest, which is an activity desired to be monitored.

The term "activity" (otherwise known as "business transaction") as used herein includes a sequence of operations performed for a certain user interaction purpose. Operations of a certain activity can be performed in the context of one or more processes, and each of the processes can be related to one or more applications. For example, an activity of interest can be any one of: sending an email to an outbox, copying an email, saving an email, adding a contact person to contacts list, or the like in the context of a Microsoft Outlook application. In the case where the activity includes sending an email from a Word document through a Microsoft Outlook application, two different applications (and at least two different processes) are involved in the same activity.

Different smart agents installed in different monitored devices 150 can be configured to monitor different activities related to different applications. For example, different organizations may desire to monitor different applications, depending on the nature of activity of each organization and the importance each organization gives to different business transactions which are being executed as part of these applications.

Information with respect to an activity of interest, in the agent configuration data comprises data with respect to a group comprising one or more system events of interest. Each system event represents a specific operation performed during a given activity of interest. A system event can be invoked by a user interacting with an application, by a process related to the activity of interest, or by a third party (e.g. another application such as an operating system) interacting with the application.

For example, in case the activity of interest is "send email to outbox" in a Microsoft Outlook application, the group of system events of interest can include:
1. Send email button pressed
2. Email message window closed
3. Email transmitted to outbox Each activity of interest is represented in the agent configuration data by a respective activity signature. An activity signature of a given activity is constructed from a group of "opcodes". Each opcode comprises information indicative of one or more conditions, enabling to determine a matching system event. A given system event which meets all conditions specified by a given opcode can be determined as the system event of interest represented by the given opcode.

A group of opcodes in an activity signature represents a respective group of system events which uniquely identify the given activity. Thus, a signature provides a unique identifier for identifying a respective activity of interest.

A signature is also provided with respective conditions (referred to herein as "signature conditions") defining the interrelations between different system events represented by respective opcodes in the signatures. For example, signature conditions can include information with respect to any one or more of: the order of occurrence of different system events related to the same signature, whether all system events are related to the same type of object (e.g. all related to a window object), a required time interval between the different system events related to the same signature, etc.

A given group of system events can be identified as the activity represented by a respective signature if the signature comprises a respective opcode for each system event in the group and each system event meets the conditions specified by the respective opcode and the group of system events complies with the signature's conditions.

In order to monitor a selected activity of interest agent configuration data also comprises information indicative of one or more processes (referred to herein as "processes of interest"), which take part in the selected activity of interest. Processes of interest are executed as part of one or more applications whose activity is being monitored. Processes of interest can be identified for example by one or more of: process name, process execution command and image parameters such as: product name, vendor, data created, etc. Information with respect to processes of interest can be provided as part of a respective activity signature.

As explained below, responsive to identification of a system event, queries generated based on conditions in each opcode are used by smart agent 220 for querying the respective process (i.e. the process in which the detect event is executed) and obtaining data which enables to determine whether a detected system event is an event of interest or not. Querying of processes can be accomplished using APIs and services provided by the operating system.

Reverting to FIG. 4, at block 403 an execution plan is generated. The execution plan can be generated for example by configuration module 301 in smart agent 220. Alternatively, the execution plan can be generated by another device (e.g. shared data center 110) and then transmitted to agent 220.

The execution plan is used for the purpose of operational data enrichment (or more specifically system events data enrichment) and for screening irrelevant system events. When a system event is initially detected, the information which is obtained with respect to the detected system event is often limited and insufficient for determining whether it is an event of interest or not. For example, assuming an object of the type "object create" is detected, the initial information indicates that an "object create" event has been executed. A type identifier indicating the type of event that has been executed can be obtained by an event callback or invoke generated by the operating system in response to the execution of the system event. However, the initial information does not always provide information with respect to other properties of the event such as: the type of object that was created (e.g. was it a window object or a button object?); is the object visible or hidden?; what is the title on the object?

During data enrichment, which is executed in accordance to the execution plan, additional descriptive data with respect to detected system events is obtained. The additional descriptive data is used for characterizing detected system events and determining whether detected system events comply with conditions of respective opcodes and thus determine whether they are system events of interest or not.

As mentioned above, each opcode comprises conditions for identifying a respective system event. The conditions associated with a given opcode are translated in the execution plan into queries for determining whether an identified system event complies with the conditions.

Reverting to the above example of a "send email to outbox" activity:

A first opcode can include conditions for the first system event "send email button pressed". The conditions can include for example:

1. is system event type=button pressed;
2. is application=Microsoft Outlook;
3. is button visible when pressed=yes;
4. is title of button="send";

The conditions are translated into respective queries in the execution plan. Queries can be implemented by invoking various types of API (Application Programming Interface) functions which enable to obtain the required information for determining compliance with the conditions. A condition in an opcode can be represented by at least one respective API function configured for obtaining the required descriptive information.

The execution plan is generated based on the agent configuration data. Configuration module 301 in smart agent 220 can be configured to extract from opcodes, in each activity signature in the agent configuration data, conditions defining respective system events of interest and to translate the conditions into respective queries in the execution plan. Configuration module 301 can be further configured to extract from activity signatures, information with respect to one or more processes of interest and signature conditions.

In addition, the logical structure of the execution plan is determined based on rules defined by the query logic. Query logic, which can be also provided as part of agent configuration data, includes rules for guiding the process of generating the execution plan for the data enrichment.

Query logic rules are directed for generating an execution plan with reduced interference and potential of collision with other processes running on the monitored device. Query logic can include for example, rules for constructing queries and rules for ordering queries in the execution plan.

For example, one principle of the query logic can be to reduce the number of queries which are used during data enrichment. The less the number of queries, the smaller the risk of interference and collision.

Query logic rules can include for example:

1. List of excluded queries, which are forbidden for use (e.g. queries which are known from experience to cause performance degradation). Excluded queries can be limited to a specific process or a system event type.
2. Rules for selecting queries which provide better screening capabilities:
   a. Using only relevant queries—avoiding executing queries which do not provide useful information for screening detected events (e.g. if all opcodes refer to an object named: "button pressed" do not query about other names of system events).
   b. Rules for prioritizing queries in execution plan in order to reduce number of queries and more efficiently screen irrelevant system events. For example, starting with queries which are common to all or most of the opcodes in given activity signatures, and then proceeding with more specific queries (e.g. if all opcodes in a given activity signature refer to visible objects, generating a query "is visible" enables to immediately screen all events which are not related to visible objects and are therefore irrelevant). Also, starting with queries which are common to multiple opcodes in different activity signatures.
3. Avoiding unnecessary repetitions of queries. For example, if multiple conditions in an opcode refer to different state values of an object related to a system event (e.g. is focused=yes; is pressed=yes; is visible=yes), if possible only one query with respect to the state of the object is used. The query can be directed to retrieve the object state (e.g. querying "what is object state"). The information retrieved by this type of query can include all data with respect to the state of the object, responding to all the relevant conditions. Thus, a single query can be used to determine if all the required conditions with respect to the object state are met.
4. Combining multiple queries regarding different properties of an object related to a system event, into a single batch query, if allowed by the specific API which is being used. A batch query comprises multiple queries, each regarding a different property of the same object. Thus, a single query is used instead of multiple queries.
5. Assistive technology queries for associating between raw HID events and respective assistive technology objects, as described below.
6. Monitoring latency of assistant technology queries to actively halt queries in case high latency is identified in order to reduce the risk of interference.

According to one example, the execution plan can be represented by a hierarchical data structure (e.g. tree or directed graph). The priority of the queries in the hierarchical data structure can be derived for example from the generality of the query. Queries which are more general are those which are common to more opcodes and thus enable to screen a greater number of system events and obtain a definite result faster. Queries with higher priority can be located higher in the data structure.

Configuration module 301 can be configured to implement the query logic rules as part of the execution plan generation process. It should be noted, that although configuration module 301 (and 501) is illustrated as part of smart agent 220, this should not be construed as limiting and in other cases configuration module 301 and its respective operations can be implemented in a different device (e.g. shared data center 110).

At block 405, listeners are registered for detecting (capturing) the occurrence of system events. For example, smart agent 220 can comprise one or more system event listeners 303 configured to listen to running processes of interest and identify system events.

According to one approach, listeners can be configured to identify process startup and determine whether a running process is a process of interest executed as part of a monitored application. If a process of interest is identified, listeners are configured to continue and listen to the system events invoked with respect to the process and identify system events of interest.

In order to avoid missing system events executed during and near startup of the process, various approaches which are known per se (e.g. using system drivers) can be used to delay a process's startup and enable to listen to the process from its start.

According to another approach, listeners can be configured to identify all system events invoked in all applications and determine whether they are of interest. Once a system event of interest is identified listeners can be configured to determine whether the respective process in which the event was invoked is a process of interest. If the process is identified as a process of interest, the execution plan is used in order to determine whether identified system events in the process are system events of interest.

Notably, the first approach serves the object of reducing the number of queries, in that it enables to screen all irrelevant processes before querying any of their system events and thus to avoid issuance of unnecessary queries.

Responsive to detection of given system event, initial screening can be executed (block 407). Initial screening can be executed for example by system event listeners 303. During the initial screening, detected system events which do not match any one of the system events of interest are discarded. For example, the type of the detected system event can be compared with the type of the various system events of interest as specified in the execution plan. If no system events of a matching type are found, the detected event is discarded.

If the detected system event passes the initial screening, enrichment process is executed (block 409). As mentioned above, according to an example of the presently disclosed subject matter, during the data enrichment process, assistive technology API is used.

Assistive technology API is an application programming interface which is specifically designed for enabling to access, identify, and manipulate elements of a user interface of an application and thus adapt the application to the special requirements of disabled users. Assistive technology API notifies the occurrence of various system events and enables to use these notifications for adapting an application to the needs of disabled persons. Examples of assistive technology API are Microsoft active accessibility API (MSAA) and UI Automation (UTA).

Queries in the execution plan can be generated as respective assistive technology API queries, directed for obtaining specific information with respect to a detected system event. Responsive to detection of given a system event, assistive technology queries in the execution plan can be called for the purpose of enriching the descriptive data of detected system events.

Using assistive technology API enables to detect the occurrence of system events and enrich their respective descriptive information in a non-intrusive manner. This serves the need to reduce interference and possible conflict with processes and respective applications running on the monitored device.

Assistive technology API is available where the occurrence of system events is announced by assistive technology invokes. Assistive technology invokes generally includes an invoke-handle linking a system event to a certain assistive technology object which is related to the object (e.g. UI object) on which the event was executed. Assistive technology object is a logical element that implements several APIs that allows querying various properties of that object. Assistive technology object is usually associated with a corresponding UI object, such as a window, a control, a button or other UI object, visible or invisible to a user. Assistive technology objects are organized in a hierarchical tree-like structure, sometimes mimicking the structure of underlying UI objects.

In cases where an assistive technology invoke-handle is available, it can be used by assistive event collector 305 as an identifier of an assistive technology object related to the detected system event during the data enrichment process. Assistive technology API queries are used for querying the related assistive technology object for enriching the descriptive information of the identified system events.

Not all of the system events are announced by assistive technology invokes. Yet such system events could be determined as events of interest and therefore other approaches are implemented in order to detect occurrences of such events. One of the possible approaches is utilizing raw HID (human interaction devices) APIs. HID invokes allow detecting occurrence of system events such as keyboard strokes and mouse button clicks.

In such cases when the system event invokes are not originating from assistive technology, system event invokes do not include an invoke-handle linking the event to a related assistive technology object. For example, system events which are generated by raw HID do not generate an assistive technology invoke-handle. Thus, while the occurrence of raw HID events can be captured, there is still a need to bridge the gap and link between a captured raw HID system event and a related assistive technology object.

If a detected system event is associated with an assistive technology invoke-handle linking the detected system event to a related assistant technology object, assistive technology is used for enriching event descriptive data (block 415). Accordingly, the assistive technology API queries, as indicated in the execution plan, are used for querying the assistive technology object and thus obtaining respective descriptive information.

For example, assistive event collector 305 can be configured to receive from system event listeners 303 an indication with respect to a detected system event invoke-handle and to use the execution plan for invoking assistive technology API queries for obtaining additional descriptive information from the related assistive technology object.

Reverting to the example mentioned above, if an "object create", system event is detected the initial information (e.g. obtained from event listener 303) comprises an assistive event type identifier, indicating that a system event of the type "object create" has been executed. Assuming that an "object create" is one of the system events types in the execution plan, assistive event collector 305 is configured to use the queries as specified in the execution plan and call the respective assistive technology API functions. The API functions are directed to query the related assistive technology object, which is identified and accessed using the event's invoke-handle, for obtaining more information describing the detected "object create" event.

If the system event invoke does not include an invoke-handle, the event is first linked to a related assistive technology object (block 413) and then assistive technology is used for querying the related assistive technology object for enriching the descriptive data of the detected event (block 415).

To this end, system events listeners 303 can be configured to capture raw HID system events such as mouse clicks and keyboard strokes. Capturing raw HID system events can be accomplished with the help of operating system APIs which are designated for this purpose.

The captured raw HID system events are forwarded to raw HID collector 307 configured to obtain information characterizing detected raw HID system events (referred to herein as "object association data"), which enables to link a raw HID event to a related assistive technology object. Assistive technology association module 309 is configured to use the obtained object association data for linking the captured raw HID system event with one or more related assistive technology objects. Instructions for associating between raw HID system events and related assistive technology objects can be provided as part of the query logic. Instructions can depend on the type of the HID event being associated. The instructions include assistive technology API queries for associating captured raw HID system events with related assistive technology objects.

For example, a captured mouse click system event provides screen coordinates indicative of the location of the mouse cursor on the screen at the time of the click. The mouse click coordinates, which can serve as object association data, can be obtained for example, by raw HID collector 307.

Assistive technology association module 309 can be configured to use the mouse click coordinates to determine which object was located at the specified screen coordinates at the time of the mouse click event (e.g. a specific window or button that was clicked). The execution plan can comprise assistive technology API queries which enable to identify an object located at certain screen coordinates. An object located at the specified coordinates at the time of the mouse click event can be linked to the mouse click event as the clicked object.

Furthermore, the borders of the clicked object can be also determined using assistive technology API queries enabling to conclude whether the click was a valid mouse click (e.g. mouse press and release occurred within the object boundaries), whether it was a single click or double click (e.g. two clicks occurring at the same location in a short period of time), etc.

In the event of a keyboard stroke, the captured system events include information indicative that a certain key has been pressed. According to the presently disclosed subject matter, assistive technology association module 309 can be configured to save the last assistive technology object in keyboard focus by constantly following assistive technology "focus" events generated by the respective monitored process. Only the last focus is saved, as only one object can be in focus at any given time. Responsive to a detected keyboard stroke event, assistive technology association module 309 can be further configured to link the detected key stroke event with an object on which the last keyboard focus was located. The execution plan can accordingly comprise assistive technology API queries which enable to identify an object associated with a detected keystroke event, i.e. the object located at the last keyboard focus.

Once the raw HID event is linked to one or more related assistive technology objects, information with respect to the event can be obtained in a same manner described above, by using assistive technology API for querying information with respect to the associated assistive technology object (e.g. with the help of assistive technology collector 305).

After descriptive information characterizing a detected system event is obtained, it can be determined whether the detected system event is an event of interest or not (block 417). The results of the assistive technology API queries are compared to the conditions specified in a respective opcode. An opcode can be identified as an opcode related to a detected system event, if the opcode represents a system event of a type matching the type of the detected system event. If the results of the queries meet the conditions, the detected system event is determined as the event represented by the respective opcode in a signature (block 419). Otherwise, the detected system event is discarded (block 421).

To this end data analyzer 311 in smart agent 220 can be configured (e.g. with the help of opcode comparator 313) to compare the descriptive information of a detected system event, with the conditions specified for each opcode and identify an event of interest if the descriptive information complies with the required conditions.

Furthermore, system events are being continuously detected and analyzed to determine whether they represent events of interest. An activity of interest can be identified when a group of system events of interest represented by a group of respective opcodes in the signature representing the activity of interest, are identified (block 423).

For this purpose, data analyzer 311 can further comprise signature comparator 315 configured for determining whether an entire group of system events uniquely representing a respective activity of interest is identified. Furthermore, if such a group of system events is identified, it is further determined that system events in the group comply with the respective signature conditions defining the interrelations between the different system events in the group.

Signature comparator 315 can be configured as a state machine receiving system events as input and using this input to determine whether an activity of interest has been performed.

Once an activity of interest is identified, respective performance data can be collected (block 425). Performance data collection can be executed by performance data collector 317. Performance data can include raw information of monitored processes and activities as well as various timestamps measuring latency of activities of interest. Analysis of performance data (block 427) can serve to determine various user computing performance metrics and statistic as well as various computing environment performance metrics and statistics (e.g. interaction response time, user interaction statistics, CPU load, memory consumption, network usage, applications usage, application activity frequencies).

For example, assuming a "send email" activity was identified, the latency of a "send email" instruction can be determined. A timestamp indicating the time the send email button was pressed and a time indicating the time the email was actually sent can be obtained. The difference between these two timestamps indicates the interaction response time of execution of the "send email" activity.

In another example, assuming the identified activity is "open Microsoft Outlook application". The interaction response time of an "open Microsoft Outlook application" activity can be determined. A first timestamp indicating the time the application was started (e.g. the Outlook icon was pressed) and a second timestamp indicating when the Inbox was shown listing all the emails and the status bar indicating the number of items (indicating that Outlook has started) can be obtained. The difference between these two timestamps indicates the interaction response time of the execution of the "open Microsoft Outlook application" activity.

If, however, a user was prompted to enter his user name and password, after the instruction to open Outlook was made, this activity is identified as well along with respective timestamps. The time between the appearance of a login dialog window and the time the "OK" button of the login dialog window was pressed is determined and can be excluded during the calculation of interaction response time of the execution of the "open Microsoft Outlook application".

According to one example, analysis of monitored processes can be executed at smart agent 220 (e.g. with the help of performance data analyzer 319). Additionally or alternatively, the collected performance data can be transmitted to data center 110 or to another computerized device which can be configured to execute performance data analysis of monitored processes of interest.

FIG. 5 is a functional block diagram of a signature generator, in accordance with the presently disclosed subject matter. For clarity purposes, the description of the operations in FIG. 6 is made with reference to respective elements illustrated in FIG. 5. However, this is done by way of example only, and the operations in FIG. 6 should not be construed to be limited by the specific configuration which is exemplified in FIG. 5.

Signature generator is configured in general to generate signatures of respective activities of interest to enable the identification and monitoring of these activities. Signature generator 520 can be located as part of shared data center 110, for example in monitoring processing unit 120. Activity signatures generated at shared data center 110 can be sent to various smart agents for enabling monitoring of processes of interest as described above. Alternatively or additionally, signature generator 520 can be located in a monitored device 150 (e.g. as part of smart agent 220). In case signature generator 520 and smart agent 220 are located in the same device, common functional components can be shared by signature generator 520 and smart agent 220.

In order to generate respective signatures, signature generator 520, obtains generator configuration data (block 601). Generator configuration data includes information indicative of one or more processes of interest desired to be monitored.

Given a certain process of interest, configuration module 501 can be configured to determine which of the system events of the process should be listened to, based on additional information provided in the generator configuration data. Generator configuration data can comprise, for example, rules indicating which types of system events should be listened to. The desired types can be based for example on the type of the activities to which signatures are about to be generated (e.g. the types of system events which are listened to for activities executed within native applications would be different than those executed within a web application). Optionally, all system events which are executed by processes of interest and are announced by assistive technology invokes or raw HID invokes, are selected for listening.

Configuration module 501 can be further configured to generate an execution plan (block 602). Even when almost all of the events are listened to, it is still required to determine the best execution plan of doing so. For example, an execution plan can be used to achieve one or more of the following tasks: screening events originating from processes that are not one of the processes of interest, and screening events linked to invisible objects (where only visible object are of interest). As explained above, the execution plan also serves to reduce any unnecessary interaction with the monitored applications. Accordingly, the execution plan can be generated based on query logic instructing how to generate queries for collecting information with respect to the detected system events. For example, as described above, query logic can include instructions for avoiding repetition of queries e.g. by grouping several queries in a batch query.

System event listeners 503 are registered for detecting occurrence of systems events (block 603). As explained above with reference to FIG. 3 listeners can be configured to identify process startup and determine whether any process which is running is a process of interest. If a process of interest is identified, listeners are configured to continue and listen to the system events invoked in the process.

During the signature generation process, a monitored application is executed and a user can interact with the application and perform a specific activity of interest. Signature generator 520 is configured to listen and record the system events which are being executed by running a process of interest.

Responsive to detection of given system event, initial screening can be executed. During the initial screening, detected system events which do not match any one of the system events of interest are discarded. For example, assuming the execution plan includes a list of excluded system events which are not of interest, a detected system event which appears in the exclusion list can be discarded.

The operations described with reference to blocks 605 to 611 are based on similar principles to those described above with reference to blocks 409 to 415 in FIG. 4 and therefore are not described again in full detail. Generally, once a system event of a process of interest is identified (e.g. by system event listeners 503) assistive technology API is used for obtaining additional descriptive information of the system events.

As explained above with reference to FIG. 4, if a captured system event is related to a respective assistive technology object by a respective invoke-handler, assistive technology API queries are used (e.g. by assistive events collector 505) for enriching event descriptive data (block 611). If a captured system event is a raw HID event, which is not related to a respective assistive technology object, the event is first linked to a related assistive technology object (block 609) and then assistive technology is used for enriching event descriptive data (block 611). To this end object association data can be identified by raw HID collector 507 and used by assistive technology association module 509 for linking the detected system event with an assistive technology object.

The assistive technology API queries are generated based on the information in the execution plan. Different sets of queries can be preconfigured for different types of system events. The configuration can be modified by a user according to the activities which are being listened to, or, alternatively, all the supported queries can be executed for every event which is detected.

At this point for a given process of interest one or more system events have been identified, each having respective descriptive data obtained by data enrichment.

For each activity, a subset of system events which enables to uniquely identify the activity of interest is selected (block 613). This task can be accomplished with the help of events selection module 513 and can be based on events selection logic 519.

Events selection logic can include rules for selecting a subset of system events to be represented by respective opcodes in an activity signature. Selection logic is directed for selecting a subset of system event which would have as little affect as possible on the operations of monitored applications as well as other applications running on the monitored device. Accordingly, such rules can include for example, instructions for selecting the smallest possible number of events to be represented in a given signature.

Some of the system events, which are executed by running a process of interest, may not be necessary for identifying the respective activity. In order to select system events to be incorporated in the signature, during signature generation the same process can be monitored several times in different sessions (in each session operations described with reference to blocks 604 to 605 are repeated). In each session the system events are identified and recorded (e.g. in data repository 519).

During different sessions the same activity of interest can be performed. Those system events which repeatedly appear in the different sessions can be selected as system events of interest to be incorporated in the signature representing the system event.

Optionally, in at least one of the sessions, the activity of interest is not performed. Two different groups of system events can be generated, one comprising those system events identified in sessions where the activity of interest has been performed and another group comprising system events identified in sessions where the activity of interest has not been performed. The two groups can be compared (e.g. by events selection module events selection module 513) in order to identify system events which appear only in the first group at least as part of the subset of system events which uniquely identify the occurrence of the activity of interest. Optionally, additional screening operations can be performed manually by an administrator.

For each one of the system events in the subset, a respective opcode is generated (block 615). To this end, for each system event, a group of conditions which identify the system event are determined. Each condition corresponds to a certain property characterizing the system event. Data with respect to the properties is obtainable by a respective assistive technology API query or any other type of API. Generation of opcodes can be accomplished with the help of opcodes generator 515.

For a given activity, a respective signature is generated by consolidating the opcodes generated for the system events in the subset (block 617). In addition, signature conditions defining the interrelations between different system events of a given activity are also determined. Generation of signatures can be accomplished with the help of signature generator 517. Optionally generation of opcodes and signatures can be assisted by an administrator.

The generator signatures can be stored in a designated data-repository (e.g. data repository 128) for later use during monitoring of the process (block 619).

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computerized method of monitoring activity at a monitored computerized device, the monitored device running one or more processes, at least one of the processes executing one or more system events being part of an activity, the method comprising, using a computer processor for:
   obtaining an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;
   the execution plan comprising, for at least one respective system event of interest, one or more assistive technology API queries; each query is generated based on a condition of a respective opcode and enables to obtain descriptive information of the at least one respective system event of interest;
   responsive to detection of a given system event, using the execution plan for calling the one or more assistive technology API queries of the given system event and obtaining descriptive information of the given system event;
   determining that the given system event is a system event of interest, if the descriptive information of the given system event meets the respective conditions of the respective opcode; and
   determining that a given activity of interest has been executed if system events of interest represented by a group of respective opcodes in a signature representing the activity of interest, are identified.

2. The method according to claim 1 further comprising: obtaining the agent configuration data and generating the execution plan based on the obtained agent configuration data.

3. The method according to claim 1 wherein the agent configuration data further comprises query logic comprising rules for guiding the generation of the execution plan; wherein the rules are configured to reduce interference with processes running on the monitored computerized device.

4. The method according to claim 3 wherein the execution plan is generated as a hierarchical data structure; wherein the one or more assistive technology API queries are ordered in the hierarchical data structure based on their respective priority.

5. The method according to claim 1 further comprising:
registering one or more listeners configured to listen to system events generated by one or more processes of interest capturing occurrence of system events.

6. The method according to claim 1 further comprising:
if it is determined that the given system event is a raw HID system event, linking the given system event with at least one related assistive technology object;
using the execution plan and invoking the one or more assistive technology API queries with respect to the at least one related assistive technology object.

7. The method according to claim 6, wherein associating the given system event comprises:
responsive to detection of a mouse click event, obtaining screen coordinates indicative of the mouse click location on the screen; and
using assistive technology API queries to identify at least one related assistive technology object occupying the respective coordinates at the time of the mouse click event.

8. The method according to claim 6 further comprising:
maintaining a record of the last keyboard focus; responsive to detection of a keyboard stroke event, using assistive technology API queries to identify at least one related assistive technology object on which the last keyboard focus was located.

9. The method according to claim 1 wherein the determining that a given activity of interest has been executed further comprises:
determining that system events of interest represented by the group of respective opcodes in the signature comply with respective signature conditions defining the interrelations between the system events.

10. The method according to claim 1 further comprising:
collecting performance data of the activity of interest, the collected performance data enabling to determine respective performance metrics.

11. The method according to claim 1 further comprising:
generating the at least one activity signature, comprising:
obtaining data indicative of at least one process of interest;
registering listeners for detecting occurrence of system events executed by the at least one process of interest;
responsive to detection of a system event, using assistive technology API queries for enriching event descriptive data;
selecting a group of one or more system events and generating respective opcodes for each system event in the group; and
generating a respective activity signature comprising the group of one or more opcodes of interest, the activity signature uniquely identifying a given activity.

12. The method according to claim 11 further comprising, generating activity signatures based on rules directed for reducing interference with other processes running on the monitored computerized device.

13. A monitored computerized device, the computerized device comprising at least one computer processor operatively connected to computer memory configured for running one or more processes, at least one of the processes executing one or more system events being part of an activity; the at least one computer processor being configured to:
obtain an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;
the execution plan comprising, for at least one respective system event of interest, one or more assistive technology API queries; each query is generated based on a condition of a respective opcode and enables to obtain descriptive information of the at least one respective system event of interest;
responsive to detection of a given system event, utilize the execution plan for calling the one or more assistive technology API queries of the given system event and obtain descriptive information of the given system event;
determine that the given system event is a system event of interest, if the descriptive information of the given system event meets the respective conditions of the respective opcode; and
determine that a given activity of interest has been executed if system events of interest represented by a group of respective opcodes in a signature representing the activity of interest are identified.

14. The device according to claim 13 wherein the at least one computer processor is further configured to obtain the agent configuration data and generate the execution plan based on the obtained agent configuration data.

15. The device according to claim 14 wherein the agent configuration data further comprises query logic comprising rules for guiding the generation of the execution plan; wherein the rules are configured to reduce interference with processes running on the monitored device.

16. The device according to claim 15 wherein the execution plan is generated as a hierarchical data structure; wherein the one or more assistive technology API queries are ordered in the hierarchical data structure based on their respective priority.

17. The device according to claim 13 wherein the at least one computer processor is further configured to: register one or more listeners configured to listen to system events generated by one or more processes of interest capturing occurrence of system events.

18. The device according to claim 13 wherein the at least one computer processor is further configured to: determine that the given system event is a raw HID system event and link the given system event with at least one related assistive technology object; and
call the one or more assistive technology API queries with respect to the at least one related assistive technology object.

19. The device according to claim 18, wherein the at least one computer processor is further configured to:
responsive to detection of a mouse click event, obtaining screen coordinates indicative of the mouse click location on the screen; and
using assistive technology API queries to identify at least one related assistive technology object occupying the respective coordinates at the time of the mouse click event; and linking the given system event to the identified assistive technology object.

20. The device according to claim 18 wherein the at least one computer processor is further configured to:
maintain a record of the last keyboard focus; responsive to detection of a keyboard stroke event, utilize assistive technology API queries to identify at least one related assistive technology object on which the last keyboard focus was located.

21. The device according to claim 13 wherein the at least one computer processor is further configured for determining that a given activity of interest has been executed to:
  determine that system events of interest represented by the group of respective opcodes in the signature comply with respective signature conditions defining the inter-relations between the system events.

22. The device according to claim 13 further comprising:
  collecting performance data of the activity of interest, the collected performance data enabling to determine respective performance metrics.

23. The device according to claim 13 further comprising:
  generating the at least one activity signature, comprising:
  obtaining data indicative of at least one process of interest;
  registering listeners for detecting occurrence of system events executed by the at least one process of interest;
  responsive to detection of a system event, using assistive technology API queries for enriching event descriptive data;
  selecting a group of one or more system events and generating respective opcodes for each system event in the group; and
  generating a respective activity signature comprising the group of one or more opcodes of interest, the activity signature uniquely identifying a given activity.

24. The device according to claim 23 generating activity signatures based on rules directed for reducing interference with other processes running on the same device.

25. A system for monitoring performance of one or more monitored computerized devices connected to the system over a communication network; the system comprises at least one processing unit comprising computer memory operatively connected to at least one processing unit; the at least one processing unit is configured to:
  deploy an agent to each one of the one or more monitored computerized devices;
  the agent comprising instructions for monitoring activities on the computerized devices to:
  obtain an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;
  the execution plan comprising, for at least one respective system event of interest one or more assistive technology API queries; each query is generated based on a condition of a respective opcode and enables to obtain descriptive information of the at least one respective system event of interest;
  responsive to detection of a given system event, utilize the execution plan for calling the one or more assistive technology API queries of the given system event and obtaining descriptive information of the given system event;
  determine that the given system event is a system event of interest, if the descriptive information of the given system event meets the respective conditions of the respective opcode; and
  determine that a given activity of interest has been executed if system events of interest represented by a group of respective opcodes in a signature representing the activity of interest are identified;
  the processing unit is further configured to receive from the one or more monitored computerized devices performance data of the activity of interest and utilize the collected performance data for determining respective performance metrics.

26. A program storage device readable by a machine, tangibly embodying a program of instructions executable by the machine to perform method steps of monitoring activity at a monitored computerized device, the monitored device running one or more processes, at least one of the processes executing one or more system events being part of an activity, the method comprising:
  obtaining an execution plan, the executing plan is generated based on agent configuration data; the agent configuration data is indicative of at least one process of interest and at least one activity signature; the activity signature representing a respective activity of interest and comprises a group of one or more opcodes enabling to uniquely identify the respective activity of interest; each opcode represents a respective system event of interest and comprises information indicative of one or more conditions, enabling to identify the respective system event of interest;
  the execution plan comprising, for at least one respective system event of interest one or more assistive technology API queries; each query is generated based on a condition of a respective opcode and enables to obtain descriptive information of the at least one respective system event of interest;
  responsive to detection of a given system event, using the execution plan for calling the one or more assistive technology API queries of the given system event and obtaining descriptive information of the given system event;
  determining that the given system event is a system event of interest, if the descriptive information of the given system event meets the respective conditions of the respective opcode; and
  determining that a given activity of interest has been executed if system events of interest represented by a group of respective opcodes in a signature representing the activity of interest are identified.

\* \* \* \* \*